(12) United States Patent
Sekiguchi

(10) Patent No.: US 7,930,463 B2
(45) Date of Patent: Apr. 19, 2011

(54) INFORMATION PROCESSING APPARATUS

(75) Inventor: Hiroshi Sekiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 12/273,016

(22) Filed: Nov. 18, 2008

(65) Prior Publication Data

US 2009/0193170 A1    Jul. 30, 2009

(30) Foreign Application Priority Data

Jan. 25, 2008   (JP) ................................ P2008-015405

(51) Int. Cl.
*G06F 13/14*   (2006.01)
*G06F 13/10*   (2006.01)

(52) U.S. Cl. .......................... 710/316; 710/300

(58) Field of Classification Search .......... 710/300–304, 710/316–317, 104–105, 110
See application file for complete search history.

(56) References Cited

U.S. PATENT DOCUMENTS

| | | | | |
|---|---|---|---|---|
| 5,307,462 A * | 4/1994 | Hastings | ......................... | 710/10 |
| 5,638,521 A * | 6/1997 | Buchala et al. | ................ | 710/316 |
| 5,978,389 A * | 11/1999 | Chen | ................. | 370/538 |
| 6,308,239 B1 * | 10/2001 | Osakada et al. | ............. | 710/316 |
| 6,324,605 B1 * | 11/2001 | Rafferty et al. | ............... | 710/100 |
| 6,532,512 B1 * | 3/2003 | Torii et al. | ..................... | 710/316 |
| 6,546,450 B1 * | 4/2003 | Liu | .............................. | 710/316 |
| 6,549,966 B1 * | 4/2003 | Dickens et al. | ............... | 710/300 |
| 6,600,739 B1 * | 7/2003 | Evans et al. | ................... | 370/362 |
| 6,944,700 B2 * | 9/2005 | Bateman et al. | ............. | 710/300 |
| 7,047,344 B2 * | 5/2006 | Lou et al. | ..................... | 710/305 |
| 7,093,057 B2 * | 8/2006 | Choi | ............................. | 710/313 |
| 7,127,546 B2 * | 10/2006 | Ying et al. | ..................... | 710/316 |
| 7,237,054 B1 * | 6/2007 | Cain et al. | ..................... | 710/305 |
| 7,246,189 B2 * | 7/2007 | Ulenas | ......................... | 710/305 |
| 7,478,191 B2 * | 1/2009 | Wurzburg et al. | ............ | 710/316 |
| 7,502,878 B1 * | 3/2009 | Wright | ............................ | 710/37 |
| 7,523,243 B2 * | 4/2009 | Bohm et al. | .................. | 710/305 |
| 7,624,222 B2 * | 11/2009 | Nanda et al. | .................. | 710/316 |
| 2003/0110342 A1 * | 6/2003 | Chiang et al. | ................ | 710/316 |
| 2005/0060490 A1 * | 3/2005 | Lu | ................................. | 711/115 |
| 2005/0216620 A1 * | 9/2005 | Sandulescu et al. | ........... | 710/62 |
| 2006/0123182 A1 * | 6/2006 | Sandulescu et al. | .......... | 710/316 |
| 2007/0180181 A1 * | 8/2007 | Chen et al. | .................... | 710/313 |

FOREIGN PATENT DOCUMENTS

EP    1 694 065 A1    8/2006

(Continued)

*Primary Examiner* — Mark Rinehart
*Assistant Examiner* — Trisha Vu
(74) *Attorney, Agent, or Firm* — Oblon, Spivak, McClelland, Maier & Neustadt, L.L.P.

(57) ABSTRACT

An information processing apparatus for communicating with an external apparatus via a predetermined communication interface including a data signal line and an insertion/removal signal line is provided. The information processing apparatus includes a processing unit for executing an application that a user desires, a communication controlling unit for controlling a communication operation using the predetermined communication interface, at least two communication connectors that comply with the predetermined communication interface, an analog switch for switching between each of the at least two communication connectors and the communication controlling unit, and an interface controlling unit for enabling the data signal line of one of the at least two communication connectors by switching connection to the data signal line using the analog switch so as to cause the communication controlling unit to perform communication with an external apparatus connected to the enabled communication connector.

8 Claims, 4 Drawing Sheets

FOREIGN PATENT DOCUMENTS

| | | |
|---|---|---|
| JP | 2000-76038 | 3/2000 |
| JP | 2001-43178 | 12/2001 |
| JP | 2002-140281 | 5/2002 |
| JP | 2002-232750 | 8/2002 |
| JP | 2002-237971 | 8/2002 |
| JP | 2003-223413 | 8/2003 |
| JP | 2003-264737 | 9/2003 |
| JP | 2004-334823 | 11/2004 |
| JP | 2005-208311 | 8/2005 |
| JP | 2006-165851 | 6/2006 |

* cited by examiner

INFORMATION PROCESSING APPARATUS

CROSS REFERENCES TO RELATED APPLICATIONS

The present invention contains subject matter related to Japanese Patent Application JP 2008-015405 filed in the Japanese Patent Office on Jan. 25, 2008, the entire contents of which are incorporated herein by reference.

BACKGROUND OF THE INVENTION

1. Field of the Invention

The present invention relates to an information processing apparatus, such as a personal computer or a digital camera, including a universal serial bus (USB) port that is commonly used by mobile devices and that serves as an external communication interface and, in particular, to an information processing apparatus serving as a USB device (a USB peripheral).

More particularly, the present invention relates to an information processing apparatus serving as a USB device and being connected to two or more USB hosts in a multiplexed manner and, in particular, to an information processing apparatus being connected to two or more USB hosts in a multiplexed manner through one USB device interface.

2. Description of the Related Art

A universal serial bus (USB) is a general-purpose bus interface that supports a plug-and-play function and that replaces legacy ports, such as a serial port (RS-232C) and a parallel port. Initially, the specification of a USB is developed by four companies including Intel Corporation. Nowadays, USB Implementers Forum, Inc. (USB-IF), which is a nonprofit organization (NPO), determines and manages the specification of a USB. In recent years, the USB 2.0 standard that provides a high speed mode in which data are transferred at a speed (max. 480 Mbps) higher than the speed of IEEE 1394 (max. 400 Mbps) has been widely used.

The USB standard defines specification groups called "USB classes" in accordance with the features of peripheral devices. Devices that comply with one of the class specifications provide the same features. Therefore, devices that comply with one of the class specifications can be operated under the control of the same class driver. Consequently, device-specific driver software is not necessary.

In a USB communication system, one of a plurality of devices functions as a "host", and the others function as "devices". In addition, one end of a USB cable has an "A plug" to be connected to the host while the other end has a "B plug" to be connected to a device. Thus, a USB cable has an asymmetrical structure. An apparatus connected to the A plug serves as a host, and an apparatus connected to the B plug serves as a device. The device is also referred to as a "function" or a "peripheral". However, hereinafter, only the term "device" is used.

In a USB communication system, the host performs scheduling. The communication is initiated by the host at all times, and a device responds to the host. That is, the host sends a request to a device, and a device returns a response to the host. Thus, communication is performed. The device sends its own information to the host or exchanges data with the host only when the device responds to a request received from the host. That is, the host performs overall control of data communication in a USB interface so that the host can communicate with a plurality of devices. In contrast, the device performs communication under the control of the host. The communication partner of the device is the host in any case.

The USB standard is widely used and can be found when a hard disk unit, a printer, a scanner, or a modem that serves as a device is connected to a personal computer (PC) that serves as a host. Thus, the USB standard is the de facto standard in the industry. In addition, recently, a mobile device, such as a digital camera or a portable music player, that operates independently has been connected to a PC as a USB device and has been used for a data transmission apparatus or a data reception apparatus of the PC.

For example, Japanese Unexamined Patent Application Publication No. 2002-237971 describes an electronic still camera that exchanges image data with a PC connected thereto via a USB cable and charges a buttery thereof at the same time.

On the other hand, in many cases, a mobile device, such as a digital camera, is connected to a PC via a base station called a "cradle" instead of being directly connected to a connector of a PC. A cradle unit is used for charging a battery of the mobile device. In addition, in many cases, the cradle unit includes a USB port or a serial port so as to provide a port connection function. When being placed on the cradle, the mobile device can synchronize its data with data in a PC or a USB host. Furthermore, peripheral equipment, such as a printer, can be connected to the mobile device via a cradle.

A digital camera may be connected to a USB host when a user holds the digital camera in order to take a picture. In addition, a digital camera may be connected to a USB host when the digital camera is placed on a cradle in order to charge a battery of the digital camera. Accordingly, it is necessary to provide a USB connector to a digital camera and a cradle (refer to, for example, Japanese Unexamined Patent Application Publication No. 2002-232750 (FIG. 3)). However, when a mobile device, such as a digital camera, is placed on a cradle, it is difficult to connect a USB cable to a USB connector of the mobile device. Therefore, the USB cable is removed from the USB connector of the mobile device and is then connected to a USB connector of the cradle.

In the current USB specification, a scheme for multiplexing one USB device interface so that a plurality of USB hosts are connected to the USB device interface is not provided. Suppose that a USB device has two USB connectors. When a USB cable is connected to one of the USB connectors and if another USB cable is connected to the other connector, the USB device may malfunction or may be damaged, since the USB device does not have an arbitrator that determines which USB host the USB device should communicate with. In addition, in such a case, it is difficult for the quality of an electrical signal of the USB device to comply with the quality of an electrical signal defined by the USB specification.

Note that, in order to multiplex a USB interface, a USB hub is available. However, a USB hub is designed so that a plurality of USB devices are connected to only a USB host interface. Thus, a USB hub is not designed so as to be applied to a USB device.

For example, the necessity of multiplexing a USB device interface can be eliminated by providing a USB connector to a cradle without providing a USB connector to a mobile device, such as a digital camera (refer to, for example, Japanese Unexamined Patent Application Publication No. 2006-165851 (FIG. 1)). However, since a mobile device is connected to a USB host only via a cradle, it is necessary for a user to carry a cradle together with the mobile device. This is troublesome for the user. In addition, in order to connect a digital camera to a USB host when the digital camera is operated by a user in addition to when the digital camera is placed on a cradle for charging a battery, it is necessary for the digital camera to have a USB connector. For example, a user may wish to connect a peripheral device having a USB host interface (e.g., a GPS or a microphone) to a digital camera during capturing of an image. In addition, a user may wish to print an image using a printer while operating the digital camera.

If a plurality of USB device interface circuits are implemented in the mobile device, USB connection is achieved between a USB host and each of the mobile device and the cradle. However, since the number of circuit components increases, the manufacturing cost of a mobile device increases. Thus, this solution is not practical.

For example, an information processing apparatus that functions as a USB host is described in Japanese Unexamined Patent Application Publication No. 2004-334823. The information processing apparatus includes internal USB devices connected to a board pattern. The number of the internal USB devices is greater than the number of ports of the USB host. When switching between the internal USB devices, a non-connection period is provided during the switching time. Thus, a USB host controller can recognize a new one of the internal USB devices connected thereto.

As described above, when the information processing apparatus functions as a USB host, the information processing apparatus allows two or more USB devices to be connected thereto. That is, multiplexing a USB host interface can be realized. However, the information processing apparatus does not allow a USB device to be connected to two or more USB hosts. That is, multiplexing a USB device interface is not realized. In addition, this information processing apparatus is designed so that two or more USB devices are connected to the USB host controller via an analog switch that is switched by a control central processing unit (CPU). However, the control CPU is unable to detect a USB device connected to a USB connector in a non-connection mode. A USB device connected to the USB connector in a non-connection mode is also unable to detect the connection.

SUMMARY OF THE INVENTION

The present invention provides an excellent information processing apparatus capable of appropriately functioning as a USB device.

The present invention further provides an excellent information processing apparatus capable of functioning as a USB device and capable of being connected to two or more USB hosts in a multiplexed manner.

The present invention still further provides an excellent information processing apparatus capable of being connected to two or more USB hosts via one USB device interface in a multiplexed manner.

According to an embodiment of the present invention, an information processing apparatus for communicating with an external apparatus via a predetermined communication interface including a data signal line and an insertion/removal signal line is provided. The apparatus includes processing means for executing an application that a user desires, communication controlling means for controlling a communication operation using the predetermined communication interface, at least two communication connectors that comply with the predetermined communication interface, an analog switch for switching between each of the at least two communication connectors and the communication controlling means, and interface controlling means for enabling the data signal line of one of the at least two communication connectors by switching connection to the data signal line using the analog switch so as to cause the communication controlling means to perform communication with an external apparatus connected to the enabled communication connector.

As used herein, the term "predetermined communication interface" refers to a "universal serial bus (USB) interface". The data lines correspond to D+ and D−. The insertion/removal detection signal line corresponds to VBUS. The information processing apparatus functions as a USB device. The information processing apparatus performs USB communication with the external apparatus USB-connected thereto and functioning as a USB host.

The processing means performs application processing that the user desires. The processing means includes a central processing unit (CPU). For example, the processing means can perform a variety of user interface (UI) applications based on communication with a USB-connected USB host. In addition, the communication means for controlling communication operations using the USB interface includes a USB controller and a USB physical layer circuit. Furthermore, the interface controlling means can include a general-purpose input/output controller, such as a GPIO.

An example of the information processing apparatus is a mobile device, such as a digital camera. The mobile device is placed on a base station called a "cradle" so that a battery of the information processing apparatus is charged or data in the information processing apparatus is synchronized with data in a USB host. At least one of at least two communication connectors is provided to the body of the information processing apparatus, and at least one of the other communication connectors is set on the cradle so as to be usable.

Communication systems that employ a USB interface have been in widespread use. For example, in general, mobile information processing apparatuses, such as digital cameras, operate as USB devices. Such mobile information processing apparatuses can be externally connected to a personal computer and a printer via a USB cable.

In contrast, in general, a mobile information processing apparatus, such as a digital camera, is placed on a cradle in order to charge a battery of the mobile information processing apparatus or connect the mobile information processing apparatus to a USB host or other peripheral equipment via the cradle.

There is an increasing demand for USB connection of a digital camera to a USB host in the following two cases: when a user holds the digital camera and shoots a picture and when the digital camera is placed on a cradle for charging a battery. Accordingly, it is necessary to provide a USB connector to each of the body of the digital camera and the cradle.

In such a case, USB cables can be connected to both the USB connectors of the digital camera and the cradle at the same time. However, the USB specification does not provide a scheme that allows one USB device interface to be connected to a plurality of USB hosts in a multiplexed manner.

In contrast, according to the above-described embodiment, the digital camera is configured so that USB connection is available using the USB connector provided on the body of the camera and the USB connector provided on the cradle. The data signal lines D+ and D− included in the USB interface are connected to the USB physical layer circuit and the USB controller via the analog switch. By switching the analog switch, only the data signal lines of one of the USB connectors can be enabled so that USB communication is performed. Accordingly, by adding minimum hardware to the USB interface, multiplexing of the USB device interface can be realized.

When external apparatuses are connected to at least two of the at least two communication connectors, the processing means may instruct the interface controlling means which one of the communication connectors to select and instruct the interface controlling means to enable the data signal lines in the selected communication connector. For example, for mobile devices, such as digital cameras, a USB connector provided on the cradle is connected to a printer, and a USB connector provided on the body of the camera is connected to a PC. Subsequently, one of the USB connectors can be enabled for USB connection in accordance with the operation mode of the camera.

In addition, the processing means may predefine the correspondence between a communication connector to be selected and one of the operation state of the information processing apparatus and an application to be executed and may instruct the interface controlling means to enable the data signal lines of the selected communication connector regardless of the connection state of the communication connectors to external apparatuses. For example, by predefining the USB connector to be enabled corresponding to the operation state of the camera, one of connected external apparatuses can be selected in accordance with an application being currently executed in the camera.

Alternatively, the interface controlling means can receive insertion/removal signals from the at least two communication connectors so as to monitor the communication cable insertion/removal states of the communication connectors. In this way, the interface controlling means can determine one of the communication connectors to be enabled on the basis of the monitoring results. For example, in the case of two USB connectors provided to a digital camera and a cradle, the interface controlling means can first enable a USB connector to which a USB cable is connected first so that the enabled USB connector is used for USB communication with a USB host. Alternatively, if a USB cable is connected to a second USB connector while a first USB connector is being used for USB communication, the first USB connector may be disabled, and USB communication may be switched to a newly connected USB host.

According to the embodiment of the present invention, an excellent information processing apparatus that can appropriately function as a USB device can be provided.

According to the embodiment of the present invention, an excellent information processing apparatus that can function as a USB device and that can be connected to two or more USB hosts in a multiplexed manner can be provided.

According to the embodiment of the present invention, an excellent information processing apparatus that can be connected to two or more USB hosts in a multiplexed manner via one USB device interface can be provided.

According to the embodiment of the present invention, by adding a minimum hardware to an information processing apparatus that functions as a USB device, a USB device interface can be multiplexed.

Thus, for example, for mobile devices, such as digital cameras, a USB connector provided on the cradle is connected to a printer, and a USB connector provided on the body of the camera is connected to a PC. Subsequently, one of the USB connectors can be enabled for USB connection in accordance with the operation mode of the camera.

In addition, by predefining the USB connector to be enabled corresponding to the operation state of the camera, external apparatuses can be switched in accordance with an application running in the camera.

Furthermore, in the case of two USB connectors provided to a digital camera and a cradle, the information processing apparatus can first enable a USB connector to which a USB cable is connected first so that the enabled USB connector is used for USB communication with a USB host. Alternatively, if a USB cable is connected to a second USB connector while a first USB connector is being used for USB communication, the first USB connector may be disabled, and USB communication may be switched to a newly connected USB host.

Further features and advantages of the present invention will become apparent from the following description of exemplary embodiments with reference to the attached drawings.

DESCRIPTION OF THE PREFERRED EMBODIMENTS

Various exemplary embodiments of the present invention are described in detail below with reference to the accompanying drawings.

Figure 1:
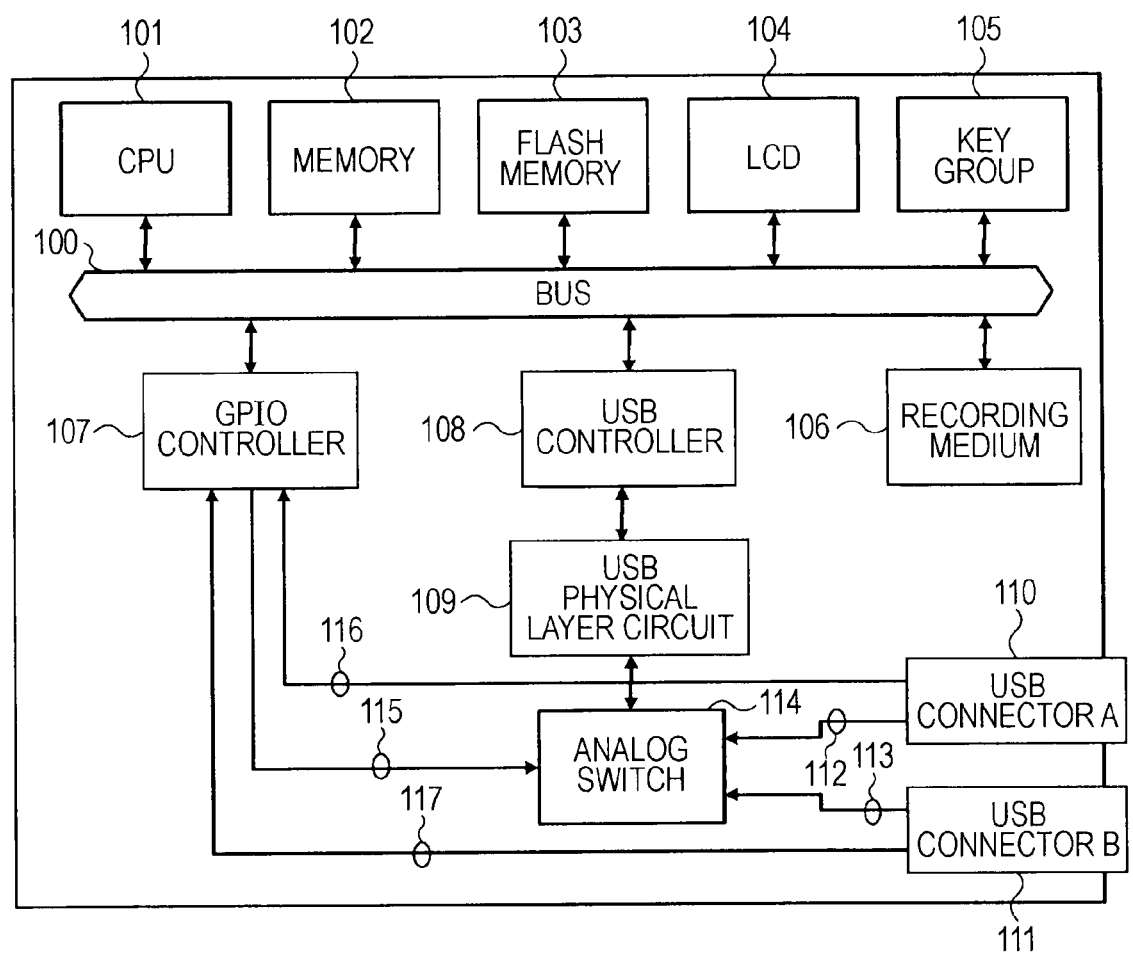
FIG. 1 is a schematic illustration of an exemplary hardware configuration of an information processing apparatus according to an embodiment of the present invention.

FIG. 1 is a schematic illustration of an exemplary hardware configuration of an information processing apparatus according to an embodiment of the present invention. Examples of such an information processing apparatus include a mobile device, such as a digital video camera or a digital still camera. However, since the camera function is not a key feature of the embodiment of the present invention, the camera function is not shown in FIG. 1. In addition, description of the camera function is not provided.

As shown in FIG. 1, the information processing apparatus includes function modules 101 to 108 connected to one another via a bus 100. A CPU 101 performs overall control of the information processing apparatus.

A memory 102 is composed of a volatile memory device, such as a dynamic random access memory (DRAM). A flash memory 103 is a read only memory that allows data stored therein to be electrically rewritable, such as an electrically erasable programmable read only memory (EEPROM). The flash memory 103 nonvolatilely stores an executable program code and device-specific information. The CPU 101 executes a program loaded from the flash memory 103 into the memory 102. In addition, the CPU 101 uses the memory 102 as a work space. Examples of the programs executed by the CPU 101 include a variety of user interface (UI) applications that use communication with a USB host USB-connected to the information apparatus via a USB connector (described below).

A recording medium 106 is a medium mounted in a high-capacity storage unit, for example, a hard disk drive, a digital versatile disc (DVD) drive, or a Blu-ray disc drive. The recording medium 106 is used for recording audio and visual (AV) data and still image data captured by a camera function unit (not shown).

A liquid crystal display (LCD) 104 and a key group 105 serve as a user interface. A through-the-lens image captured by the camera function (not shown), a playback image read from the recording medium 106, information about recording/playback time, a recording/playback mode, and a battery level, and a menu screen are superimposed and displayed on the LCD 104 in the form of an "on-screen display (OSD)".

A USB controller 108 controls communication between the information processing apparatus and an external USB device connected to the information processing apparatus via a USB connector. The USB controller 108 complies with, for example, a USB 2.0 specification. Thus, the USB controller 108 can perform control so that the information processing apparatus functions as a USB device with respect to a USB host connected to the information processing apparatus via a USB connector using a USB cable.

As shown in FIG. 1, the information processing apparatus further includes a USB connector-A 110 and a USB connector-B 111. The USB controller 108 allows the two USB connectors to be connected thereto via an analog switch 114 in a multiplexed manner. The analog switch 114 is composed of, for example, a complementary metal oxide semiconductor (CMOS) device.

For example, when the information processing apparatus is a mobile device that can be placed on a cradle and be used, the USB connector-A 110 is provided to the body of the information processing apparatus. The USB connector-B 111 is used for the cradle. A USB compliant apparatus, such as a personal computer or a digital camera, that is desired to be USB-connected even when the USB compliant apparatus is operated by a user is connected to the USB connector-A 110. In contrast, a USB compliant apparatus (e.g., a printer) that is installed at a fixed location and communicates with the information processing apparatus may be connected to the USB connector-B 111 set on the cradle.

A general-purpose input output (GPIO) controller 107 is a module that provides input and output functions from and to an external apparatus through a contact point. In an example shown in FIG. 1, the GPIO controller 107 is used for switching the analog switch 114 that connects the above-described two USB connectors to the USB controller 108 using a control signal line 115 in a multiplexed manner.

Figure 2:
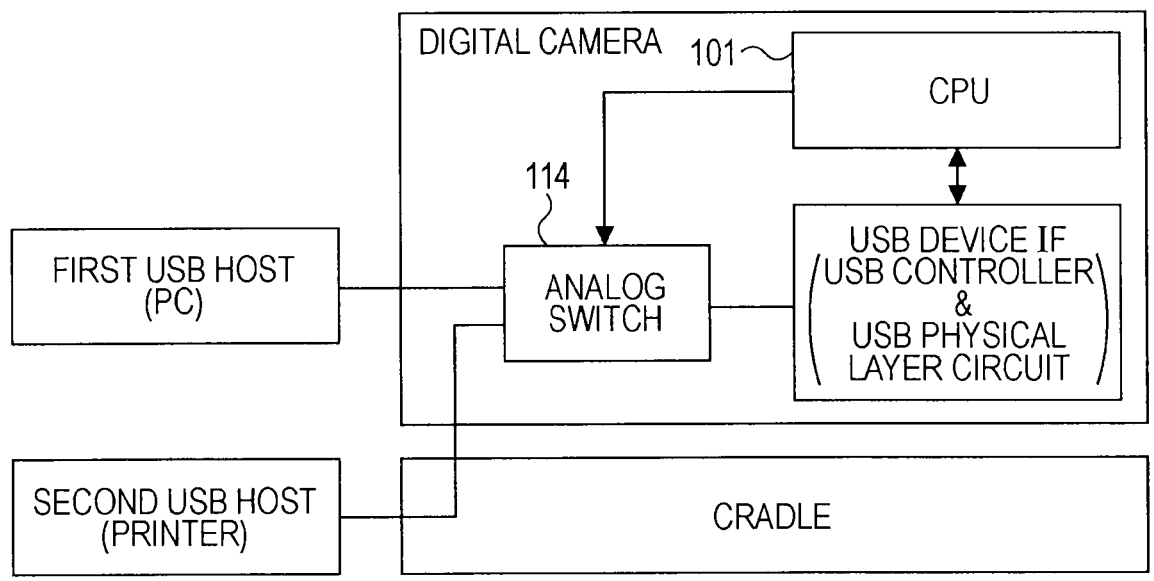
FIG. 2 illustrates a scheme for connecting two USB connectors to a USB controller in a multiplexed manner.

FIG. 2 illustrates a scheme for connecting two USB connectors to a USB device interface including the USB controller 108 and a USB physical layer circuit 109 in a multiplexed manner. As shown in FIG. 2, a first USB host (e.g., a PC) is connected to the USB connector-A 110 provided to the body of the information processing unit. A second USB host (e.g., a printer) is connected to the USB connector-B 111 set on the cradle side.

The USB interface includes data signal lines D+ and D− and a VBUS used for supplying power from the USB host interface to a downstream port. A USB device can detect whether a USB host is connected thereto via a USB cable. A USB device can regard the VBUS as an insertion/removal detection signal used for detecting whether a USB host is connected or disconnected. In contrast, a USB host can detect whether a USB device is detected or disconnected using the data signal lines D+ and D−.

As shown in FIG. 1, among interface signal lines included in each of the USB connector-A 110 and the USB connector-B 111, the VBUS (denoted by reference numerals 116 and 117) is input to the GPIO controller 107 without passing through the analog switch 114. Thus, the USB device can detect whether a USB host is connected to each of the USB connector-A 110 and the USB connector-B 111 via a USB cable on the basis of the voltage levels of VBUS signal lines. In addition, among interface signal lines included in each of the USB connector-A 110 and the USB connector-B 111, the data signal lines of D+ and D− (denoted by reference numerals 112 and 113 in FIG. 1, respectively) are switchingly connected the USB physical layer circuit 109 including an analog transceiver and receiver via the analog switch 114.

The GPIO controller 107 performs control so that the analog switch 114 enables the data signal lines D+ and D− of either one of USB connector-A 110 and the USB connector-B 111 in accordance with the connection states of the USB connector-A 110 and the USB connector-B 111 or in response to an instruction received from the CPU 101 (i.e., a higher-layer application). In this way, the USB connector-A 110 and USB connector-B 111 can be connected in a multiplexed manner.

For example, the GPIO controller 107 monitors the VBUS of each of the USB connector-A 110 and the USB connector-B 111 and enables the data lines D+ and D− of the USB connector having the VBUS to which a voltage is applied first. In this way, the USB connector-A 110 and USB connector-B 111 can be connected in a multiplexed manner.

Furthermore, as described above, in some cases, a PC is connected to the USB connector-A 110 provided to the body of the information processing apparatus, and a printer is connected to the USB connector-B 111 via a cradle. In such cases, the CPU 101 may send a command to the GPIO controller 107 in accordance with the current operating state of the digital camera (the information processing apparatus) (i.e., a state indicating whether one of an applications that communicate with the PC and an application that communicate with the printer is running). The GPIO controller 107 may enable the data signal lines D+ and D− of one of the USB connectors in accordance with an instruction included in the command.

Alternatively, the CPU 101 may predetermine a correspondence between a state and an enabled USB connector. In this way, an externally connected device can be switched in accordance with an application running in the camera.

In addition, in the case of the USB connector for a digital camera and the connector for the cradle, the CPU 101 may first enable a USB connector to which a USB cable is connected first so that the enabled USB connector is used for USB communication with a USB host. Alternatively, if a USB cable is connected to a second USB connector while a first USB connector is being used for USB communication, the first USB connector may be disabled, and USB communication may be switched to a newly connected USB host.

Figure 3:
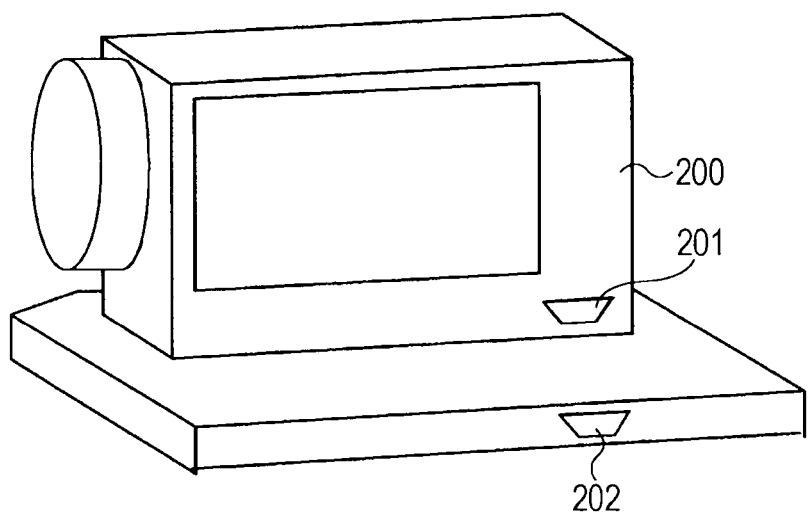
FIG. 3 illustrates a digital camera, which is an example of the information processing apparatus shown in FIG. 1, mounted on a cradle.

FIG. 3 illustrates a digital camera, which is an example of the information processing apparatus shown in FIG. 1, mounted on a cradle.

A cradle has been widely used for an attachment of a digital camera. The connection configuration shown in FIG. 3 is also widely used. A USB connector 201 (corresponding to the USB connector-A 110 shown in FIG. 1) is provided on a wall surface of a digital camera 200. In addition, a USB connector 202 (corresponding to the USB connector-B 111 shown in FIG. 1) is provided on a surface of a cradle having the digital camera 200 placed thereon.

In this example, even when the digital camera 200 is placed on the cradle, the USB connector 201 can be used. Therefore, USB hosts can be connected to either one of the USB connector 201 and the USB connector 202.

Figure 4:
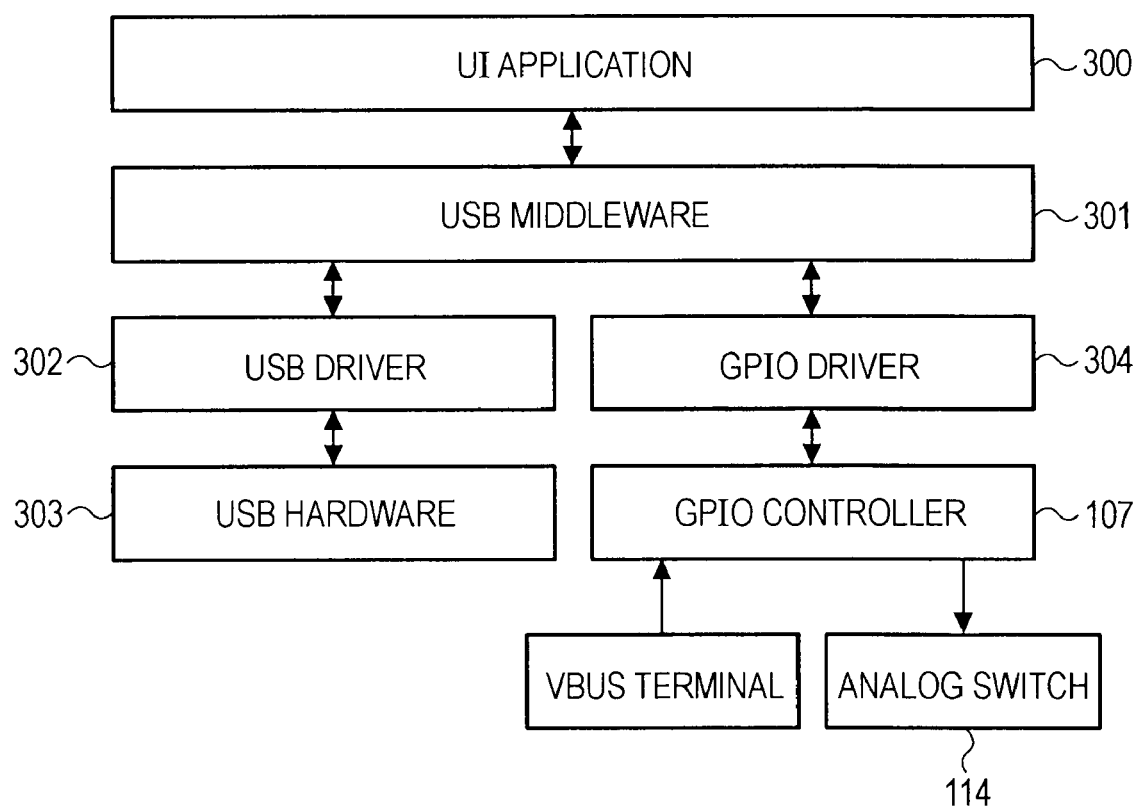
FIG. 4 illustrates a protocol stack structure for connecting two USB connectors to the USB controller in a multiplexed manner.

FIG. 4 illustrates a protocol stack structure for connecting two USB connectors to the USB controller 108 in a multiplexed manner.

A driver for driving a device is installed for each of the devices. A user interface (UI) application located in the uppermost layer calls the drivers via middleware or an operating system (OS). This scheme is widely recognized by those skilled in the art.

An upper-layer UI application 300 operates in cooperation with USB middleware 301 so as to control USB hardware 303, such as the USB controller 108, via a USB driver 302.

In addition, the upper-layer UI application 300 can operate in cooperation with USB middleware 301 so as to control the GPIO controller 107 via a GPIO driver 304. Thus, the upper-layer UI application 300 can detect the state of a VBUS terminal in a USB connector and control the analog switch 114.

Figure 5:
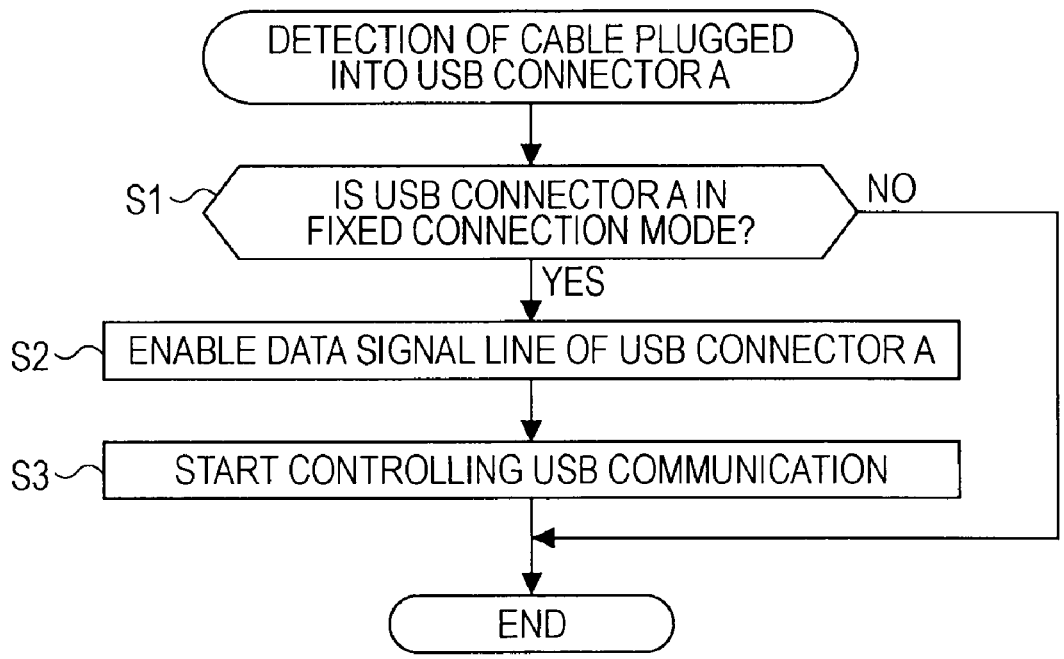
FIG. 5 is a flowchart of a processing procedure performed by the information processing apparatus when a USB cable is connected to a first USB connector provided to the body of the information processing apparatus.

FIG. 5 is a flowchart of a processing procedure performed by the information processing apparatus when a USB cable is plugged into the USB connector-A 110 provided to the body of the information processing apparatus. The processing procedure is realized when the CPU 101 executes predetermined program code.

The CPU 101 first determines whether the information processing apparatus is in a fixed connection mode in which the information processing apparatus uses the USB connector-A 110 in any case (step S1).

If the USB connector-A 110 is set to a mode in which the USB connector-A 110 is disabled ("No" at step S1), all the subsequent processes are skipped, and the processing routine is completed.

However, if the USB connector-A 110 is set to a mode in which the USB connector-A 110 is enabled ("Yes" at step S1), the CPU 101 controls the analog switch 114 via the GPIO controller 107 so that the data signal lines D+ and D− of the USB connector-A 110 are enabled (step S2). Subsequently, the CPU 101 starts USB communication control between the information processing apparatus and an external apparatus (a USB host) connected to the USB connector-A 110 using a USB cable (step S3).

Figure 6:
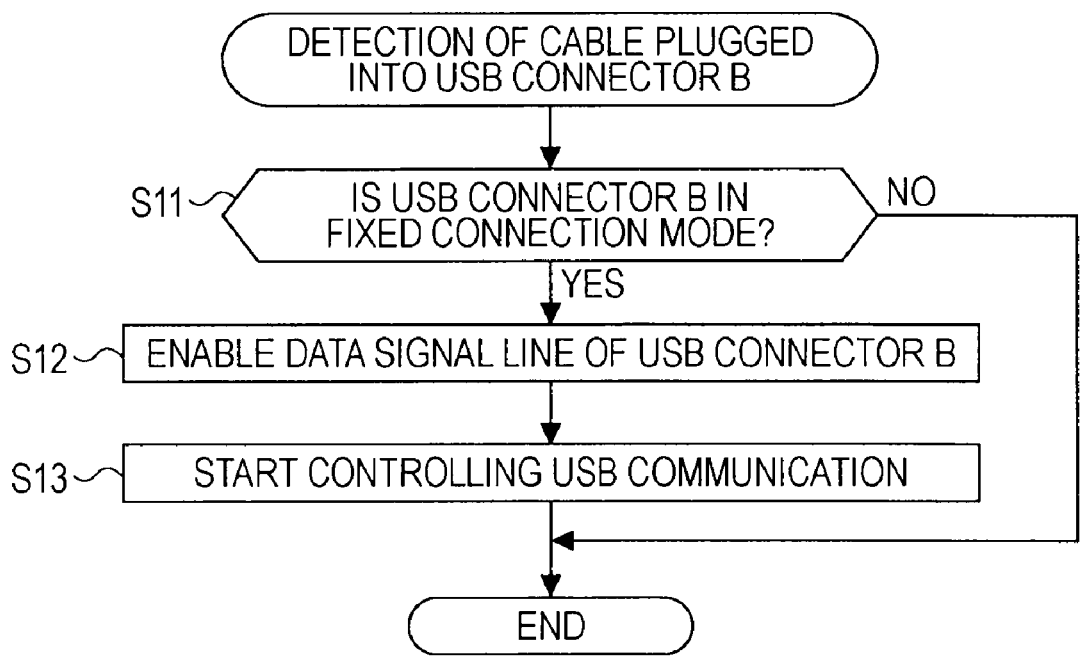
FIG. 6 is a flowchart of a processing procedure performed by the information processing apparatus when a USB cable is connected to a second USB connector provided to the cradle having the information processing apparatus placed thereon.

FIG. 6 is a flowchart of a processing procedure performed by the information processing apparatus when a USB cable is plugged into the USB connector-B 111 provided to the cradle having the information processing apparatus placed thereon. The processing procedure is realized when the CPU 101 executes predetermined program code.

The CPU 101 first determines whether the information processing apparatus is in a fixed connection mode in which the information processing apparatus uses the USB connector-B 111 in any case (step S11).

If the USB connector-B 111 is set to a mode in which the USB connector-B 111 is disabled ("No" at step S11), all the subsequent processes are skipped, and the processing routine is completed.

However, if the USB connector-B 111 is set to a mode in which the USB connector-B 111 is enabled ("Yes" at step S11), the CPU 101 controls the analog switch 114 via the GPIO controller 107 so that the data signal lines D+ and D− of the USB connector-B 111 are enabled (step S12). Subsequently, the CPU 101 starts USB communication control between the information processing apparatus and an external apparatus (a USB host) connected to the USB connector-A 110 using a USB cable (step S13).

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for communicating with an external apparatus via a predetermined communication interface including a data signal line and an insertion/removal signal line, comprising:
    processing means for executing an application that a user desires;
    communication controlling means for controlling a communication operation using the predetermined communication interface;
    at least two communication connectors that comply with the predetermined communication interface;
    an analog switch for switching between each of the at least two communication connectors and the communication controlling means, the analog switch receiving the data signal line but not the insertion/removal signal line from each of the at least two communication connectors; and
    interface controlling means for receiving the insertion/removal signal line from each of the at least two communication connectors, detecting whether at least one of the at least two communication connectors is enabled according to the insertion/removal signal line and providing the detection result to the processing means, and when the at least one of the at least two communication connectors is enabled, enabling the data signal line of the at least one of the at least two communication connectors by switching connection to the data signal line using the analog switch so as to cause the communication controlling means to perform communication with an external apparatus connected to the enabled communication connector,
    wherein the processing means controls the interface controlling means to switch the connection of the data signal line in the analog switch to connect to the communication controlling means based on an upper layer of the application which controls both the interface controlling means and the communication controlling means.

2. The information processing apparatus according to claim 1, wherein the predetermined communication interface is a universal serial bus (USB) interface, and the information processing apparatus functions as a USB device so as to allow USB communication with the external apparatus functioning as a USB host.

3. The information processing apparatus according to claim 1, wherein the information processing apparatus is configured to be set on a cradle, and wherein at least one of the at least two communication connectors is provided on a body of the information processing apparatus, and at least one of the other communication connectors is usable when the information processing apparatus is set on the cradle.

4. The information processing apparatus according to claim 1, wherein, when external apparatuses are connected to at least two of the at least two communication connectors, the processing means instructs the interface controlling means as to which one of the communication connectors to select and instructs the interface controlling means to enable the data signal line of the selected communication connector in accordance with one of an operation state of the information processing apparatus and an application being currently executed.

5. The information processing apparatus according to claim 1, wherein the processing means predefines the communication connector to be selected in accordance with one of an operation state of the information processing apparatus and an application being currently executed for instructing the interface controlling means to enable the data line of the communication connector.

6. The information processing apparatus according to claim 2, wherein the data signal line includes data signal lines D+ and D− of the USB interface, and the insertion/removal signal line includes a VBUS line of the USB interface.

7. An information processing apparatus for communicating with an external apparatus via a predetermined communication interface including a data signal line and an insertion/removal signal line, comprising:

a processing unit configured to execute an application that a user desires;

a communication controlling unit configured to control a communication operation using the predetermined communication interface;

at least two communication connectors that comply with the predetermined communication interface;

an analog switch configured to switch between each of the at least two communication connectors and the communication controlling unit, the analog switch receiving the data signal line but not the insertion/removal signal line from each of the at least two communication connectors; and an interface controlling unit configured to receive the insertion/removal signal line from each of the at least two communication connectors, detect whether at least one of the at least two communication connectors is enabled according to the insertion/removal signal line and provide the detection result to the processing unit, and when the at least one of the at least two communication connectors is enabled, enable the data signal line of the at least one of the at least two communication connectors by switching connection to the data signal line using the analog switch so as to cause the communication controlling unit to perform communication with an external apparatus connected to the enabled communication connector, wherein the processing unit controls the interface controlling unit to switch the connection of the data signal line in the analog switch to connect to the communication controlling unit based on an upper layer of the application which controls both the interface controlling unit and the communication controlling unit.

8. A communicating method, implemented on an information processing apparatus, for communicating with an external apparatus via a predetermined communication interface including a data signal line and an insertion/removal signal line, comprising:

executing, at a processing unit, an application that a user desires;

controlling, at a communication controlling unit, a communication operation using the predetermined communication interface through at least two communication connectors that comply with the predetermined communication interface;

switching, at an analog switch, between each of the at least two communication connectors and the communication controlling unit, the analog switch receiving the data signal line but not the insertion/removal signal line from each of the at least two communication connectors; and receiving, at an interface controlling unit, the insertion/removal signal line from each of the at least two communication connectors, detecting whether at least one of the at least two communication connectors is enabled according to the insertion/removal signal line and providing the detection result to the processing unit, and when the at least one of the at least two communication connectors is enabled, enabling the data signal line of the at least one of the at least two communication connectors by switching connection to the data signal line using the analog switch so as to cause the communication controlling unit to perform communication with an external apparatus connected to the enabled communication connector, wherein the processing unit controls the interface controlling unit to switch the connection of the data signal line in the analog switch to connect to the communication controlling unit based on an upper layer of the application which controls both the interface controlling unit and the communication controlling unit.

* * * * *